United States Patent [19]

Dieterich et al.

[11] 4,042,536
[45] * Aug. 16, 1977

[54] INORGANIC-ORGANIC PLASTIC

[75] Inventors: Dieter Dieterich, Leverkusen; Peter Markusch, Cologne, both of Germany; Helmut Reiff, New Martinsville, W. Va.

[73] Assignee: Bayer Aktiengesellschaft, Leverkusen, Germany

[*] Notice: The portion of the term of this patent subsequent to Sept. 21, 1993, has been disclaimed.

[21] Appl. No.: 527,386

[22] Filed: Nov. 26, 1974

[30] Foreign Application Priority Data

Nov. 30, 1973  Germany ............... 2359606

[51] Int. Cl.$^2$ ............... C08G 18/38; C08G 18/32
[52] U.S. Cl. ............... 260/2.5 AK; 260/2.5 AM; 260/2.5 AE; 260/2.5 AD; 260/29.2 TN; 260/37 N
[58] Field of Search ............... 260/2.5 AK, 29.2 TN, 260/37 N, 2.5 AM

[56] References Cited

U.S. PATENT DOCUMENTS

| 1,999,382 | 4/1935 | Weygandt | 106/65 |
|---|---|---|---|
| 2,946,112 | 7/1960 | Tucker | 264/63 |
| 3,419,533 | 12/1968 | Dieterich | 260/37 N |
| 3,479,310 | 11/1969 | Dieterich | 260/29.2 TN |
| 3,491,050 | 1/1970 | Keberle | 260/29.2 TN |
| 3,607,794 | 9/1971 | Abbotson | 260/2.5 AK |
| 3,634,342 | 1/1972 | Boblitt | 260/2.5 AK |
| 3,833,386 | 9/1974 | Wood | 260/2.5 AK |
| 3,975,316 | 8/1976 | Villa | 260/2.5 AK |
| 3,981,831 | 9/1976 | Markusch | 260/2.5 AK |
| 3,983,081 | 9/1976 | Dieterich | 260/2.5 AJ |

FOREIGN PATENT DOCUMENTS 1,137,465  12/1968  United Kingdom

*Primary Examiner*—C. Warren Ivy
*Attorney, Agent, or Firm*—Gene Harsh; Joseph C. Gil

[57] ABSTRACT

An inorganic-organic plastic having improved strength, elasticity, dimensional stability with increase in temperature and flame resistance and adapted for use in filling cracks and cavities and for making materials useful in the building industry is prepared by (1) premixing (c) an organic compound having at least one reactive hydrogen and at least one ionic group or at least one non-ionic hydrophilic group with (b) an aqueous silicate and then mixing the resulting mixture with (a) an organic polyisocyanate or (2) mixing (a), (b) and (c) simultaneously and reacting the mixture thus obtained to form a colloidal xerosol.

14 Claims, No Drawings

INORGANIC-ORGANIC PLASTIC

It is known that polyurethane plastics and polyurea plastics can be produced from organic polyisocyanates and compounds which contain active hydrogen atoms. The properties of this class of polymers can be widely varied. The high strength, elasticity and wear resistance are considered to be particularly valuable properties of these products but their thermo-stability and particularly their dimensional stability at temperatures above 120° C is only moderate. The use of such products as building and constructional elements is limited by their poor fire characteristics. Although these can be improved by means of flame-retarding agents, these agents in most cases have an adverse effect on the mechanical properties.

It is also known to produce inorganic silica gel plastics by the action of acids or anhydrides on aqueous solutions of alkali metal silicates. These plastics have become important particularly as putties and surface coatings. Light-weight foam plastics have also been produced from water glass. The products have a high dimensional stability when heated and are completely incombustible, but they are brittle and have relatively little strength. As foams, they have little ability to withstand loads and crumble when under pressure. It would be extremely desirable to combine the advantageous properties of inorganic and organic plastics materials and suppress the undesirable properties of both.

There has therefore been no lack of attempts to produce combination plastics, but the desired aim has so far not been achieved.

Thus for example polyurethanes have been mixed with active silica as filler and then vulcanized. A certain reinforcing effect can then be observed similar to that obtained when using very active carbon black, that is to say the tensile strength and modulus increase but the elongation at break decreases. However, the material is not fundamentally altered in its properties by the addition of silica, presumably because the two components form a two phase system in which only the polyurethane forms a coherent phase while the silica is embedded as an incoherent phase in the polyurethane. The incoherent zones have diameters of the order of 3 to 100 $\mu$. One is therefore dealing with relatively coarse heterogeneous two phase systems. The interaction between the two phases is only slight, both on account of the relatively small interface and on account of the very differing chemical nature of the two phases.

It has also been proposed to use silica in a microfibrous form. The reinforcing effect thereby obtained increases due to the specific morphology of this form of silica but the incoherent zones inevitably become larger so that the chemical interaction between the two phases if anything decreases. The fundamental character of a coarse heterogeneous two phase plastic remains.

It is also known to react an aqueous solution of an alkali metal silicate with a low-molecular weight polyisocyanate, e.g. 4,4'-diphenylmethane diisocyanate. This reaction in most cases results in foams in which the isocyanate phase is caused to react by the presence of water, and the carbon dioxide causes the mass to foam up, part of the carbon dioxide entering into a reaction with the surrounding aqueous silicate phase which results in gelling of the interface.

The reaction is preferably carried out with the quantity of water glass predominating so that the resulting mixture is an emulsion of the isocyanate in a coherent silicate solution. The resulting foam therefore has the character of a silicate foam which contains incoherent zones of foamed polyurea. The properties of such a foam do not differ substantially from those of a pure silicate foam. Foams obtained in this way are in fact brittle and with little ability to withstand mechanical stress.

Similar effects are obtained with other isocyanates such as cyclohexyl isocyanate, phenyl isocyanate, hexamethylene diisocyanate, diphenylmethane-2,4-diisocyanate and tolylene diisocyanate as well as adducts of these isocyanates with low-molecular weight glycols such as ethylene glycol, propylene glycol, butane-1,4-diol, hexane-1,6-diol, neopentyl glycol, glycerol and trimethylolpropane. Although the organic component with isocyanate groups which is added to the silicate solution acts as hardener, it has little influence on the properties of the foam and frequently affects it adversely. The organic component obviously exists mainly as a filler in the finished silicate structure.

A quantitative excess of diisocyanate, on the other hand, results in polyurea foams in which an incoherent silicate phase is dispersed. The properties of these foams are therefore basically those of a polyurea foam which is filled with silica, and the foams accordingly are highly combustible and extremely brittle.

If this procedure is adopted in practice (DOS No. 1,770,384), it is found that mixtures of aqueous sodium silicate solutions with diphenylmethane diisocyanate form only relatively coarse emulsions. Although this disadvantage can to a large extent be overcome by the recommended addition of emulsifiers or foam stabilizers which result in more finely divided and more stable primary emulsions, the properties as a whole are still unsatisfactory and in particular the combination plastics obtained have a marked brittleness and little strength. From the results previously obtained, it must be concluded that combination plastics of silicates and organic materials have no decisive advantage over purely organic or purely inorganic materials.

It is therefore an object of this invention to provide a process for making inorganic-organic plastics which are devoid of the foregoing disadvantages. Another object of the invention is to provide a process for making macroscopically or microscopically homogeneous inorganic-organic plastics. Still another object of the invention is to provide inorganic-organic plastics prepared from aqueous silicates and organic polyisocyanates which are substantially homogeneous and have improved strength, elasticity, dimensional stability with increase in temperature and flame resistance.

The foregoing objects and others are accomplished in accordance with this invention, generally speaking, by providing a process which involves (1) premixing (c) an organic compound having at least one reactive hydrogen and at least one ionic group or at least one non-ionic hydrophilic group with (b) an aqueous silicate and then mixing the resulting mixture with (a) an organic polyisocyanate or (2) mixing (a), (b) and (c) simultaneously and reacting the mixture thus obtained to form a colloidal xerosol.

A process has now been found by which macroscopically completely homogeneous inorganic-organic plastics can be obtained which represent solid/solid xerosols similar to the known acrylonitrile-butadiene-styrene plastics. The completely novel composite materials obtainable in this way are extremely high-quality plastics which differ advantageously in their properties both from purely organic and from purely inorganic materials. In particular, they are distinguished by their high strength, elasticity, dimensional stability in the heat and flame resistance.

It has surprisingly been found that inorganic-organic plastics with high strength, elasticity, dimensional stability under heat and flame resistance are obtained when organic polyisocyanates are homogeneously mixed with aqueous solutions of alkali metal silicate and/or aqueous silica sols in the presence of an organic compound which contains at least one hydrogen atom capable of reacting with isocyanate in addition to at least one ionic or nonionic-hydrophilic group, and the resulting sol is left to react to form a xerosol.

It was recognized, however, that although the presence of isocyanate groups is useful for obtaining the excellent properties of the resulting novel inorganic-organic plastics, it is not essential. Moreover, suitable organic compounds are not restricted to products obtained by the isocyanate polyaddition process. The essential feature, in fact, was found to be the colloidal distribution and mutual interpenetration of the two phases, whereby specifically high surface interactions or interface interactions become possible of the kind which are characteristic of xerosols. This colloidal morphology which plays an essential part in determining the properties of the composite materials according to the invention is obtained if an addition to polymers or oligomeric precursors of polymers, organic compounds which contain groups which are reactive with the polymers and/or their oligomeric precursors as well as ionic and/or nonionic-hydrophilic groups are mixed with the silicate solution.

By using organic compounds having both reactive hydrogens and ionic or non-ionic hydrophilic groups, such homogeneous distribution of the organic and aqueous inorganic phases is achieved that sols are formed in which the disperse phase has dimensions of between about 20 nm and 2 $\mu$, preferably between 50 nm and 700 nm, so that the chemical interactions increase by orders of magnitude and novel composite materials are obtained. In particular, it is also possible to produce a colloidal fibrous structure so that the two phases can exist as coherent systems. This means that a macroscopically homogeneous and in many cases even a microscopically homogeneous composite material is obtained which combines the advantages of inorganic and of organic plastics.

This invention therefore provides a process for producing inorganic-organic plastics which have high strength, elasticity, dimensional stability when heated and flame resistance which is a composite of a polymer and a polysilicic acid gel in the form of a colloidal xerosol wherein a. an organic polyisocyanate,
b. an aqueous silicate solution and/or an aqueous silica sol, and
c. an organic compound which contains at least one hydrogen atom capable of reacting with isocyanate and at least one ionic and/or non-ionic-hydrophilic group, are mixed and reacted, characterized in that mixing is carried out either by first preparing a preliminary mixture of (b) and (c) or by mixing (a), (b) and (c) together simultaneously.

The organic compounds (c) used are preferably compounds of the formula

wherein
X = —OH, —SH, —COOH, —NHR$^1$
R = C$_1$-C$_{20}$-alkylene

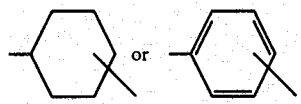

R$^1$ = —H, C$_1$-C$_{20}$-alkyl,

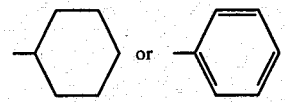

Y = —SO$_3$H, —COOH, —SO$_3^{(-)}$, —OSO$_3^{(-)}$, —NR$_3^{1(+)}$—O—(—CH$_2$—CH$_2$—O—)—$_n$R$^1$, or, $$-O-(\underset{CH_3}{\underset{|}{CH}}-CH_2-O-)-_nR^1$$

with at least 10% —O—(CH$_2$CH$_2$—O—)$_n$R$^1$ blocks,
n = 2 –100.

In the process provided by the invention, therefore, novel plastics are produced from at least three components:
1. an organic polyisocyanate,
2. an aqueous solution of an alkali metal silicate and/or an aqueous silica sol and
3. an organic compound which contains at least one hydrogen atom capable of reacting with isocyanate and at least one ionic and/or nonionic-hydrophilic group.

Any suitable organic polyisocyanate may be used as starting component (a) including aliphatic, cycloaliphatic, araliphatic, aromatic or heterocyclic polyisocyanates of the kind described e.g. by W. Siefken in Justus Liebigs Annalen der chemie, 562, pages 75 to 136, for example ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (DAS No. 1,202,785), hexahydrotolylene-2,4- and -2,6-diisocyanate and any mixtures of these isomers, hexahydrophenylene-1,3- and/or -1,4-diisocyanate, perhydrodiphenylmethane-2,4'- and/or 4,4'-diisocyanate, phenyl-1,3- and -1,4-diisocyanate, tolylene-2,4-and -2,6-diisocyanate and any mixtures of these isomers, diphenylmethane 2,4'- and/or -4,4'-diisocyanate, naphthylene-1,5-diisocyanate, triphenylmethane-4,4',4"-triisocyanate, polyphenylpolymethylene-polyisocyanates, which can be obtained by anilineformaldehyde condensation followed by phosgenation and which have been described e.g. in British patent specification Nos. 874,430 and 848,671, perchlorinated aryl polyisocyanates as described e.g. in U.S. Pat. No. 3,277,138, polyisocyanates which contain carbodiimide groups as described in U.S. Pat. No. 3,152,162, diisocyanates of the kind described in U.S. Pat. No. 3,492,330, polyisocyanates which contain allophanate groups as described e.g. in British Pat. specification No. 994,890, Belgain Pat. No. 761,626 and published Dutch Patent Application No. 7,102,524, polyisocyanates which contain isocyanurate groups as described e.g. in German Pat. Nos. 1,022,789; 1,222,067 and 1,027,394 and in German Offenlegungsschrift Nos. 1,929,034 and 2,004,048, polyisocyanates which contain urethane groups as described e.g. in Belgian Pat. No. 752,261 or in U.S. Pat. No. 3,394,164, polyisocyanates which contain acylated urea groups according to U.S. Pat. No. 3,517,139, polyisocyanates which contain biuret groups as described e.g. in U.S. Pat. No. 3,124,605, in British patent specification No. 889,050 and in U.S. patent application Ser. No. 036,500 filed May 11, 1970, polyisocyanates prepared by telomerization reactions as described e.g. in Belgian Pat. No. 723,640, polyisocyanates which contain ester groups of the kind mentioned e.g. in British patent specification Nos. 956,474 and 1,072,956, in U.S. Pat. No. 3,567,763 and in German Pat. No. 1,231,688, and reaction products of the above mentioned isocyanates with acetals according to U.S. Pat. No. 3,120,502.

The distillation residues which are obtained from the commercial production of isocyanates and which still contain isocyanate groups may also be used, if desired dissolved in one or more of the above mentioned polyisocyanates. Any mixtures of the above mentioned polyisocyanates may also be used.

It is generally preferred to use commercially readily available polyisocyanates such as tolylene-2,4- and -2,6-diisocyanate and any mixtures of these isomers ("TDI"), polyphenyl-polymethylene polyisocyanates which are obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

It is particularly preferred, however, to use polyisocyanates which are obtained by phosgenating aniline-formaldehyde condensates.

Reaction products of about 50 to 99 mols of aromatic diisocyanates with about 1 to 50 mols of compounds which contain at least two hydrogen atoms capable of reacting with isocyanate and which generally have a molecular weight of about 400 to about 10,000 may also be used.

The organic compounds having reactive hydrogens (component c) are understood to be not only compounds which contain amino groups, thiol groups or carboxyl groups but particularly also polyhydroxyl compounds and especially those which contain two to eight hydroxyl groups and which have a molecular weight of about 800 to about 10,000, preferably about 1,000 to about 6,000, e.g. polyesters, polyethers, polythioethers, polyacetals, polycarbonates and polyester amides which contain at least 2, generally 2 to 8 and preferably 2 to 4 hydroxyl groups and at least one ionic or non-ionic hydrophilic group, of the kind which are known per se for producing both homogeneous and cellular polyurethanes.

Any suitable polyesters with at least one hydroxyl group may be used to make component (c) including e.g. reaction products of polyhydric, preferably dihydric alcohols with the optional addition of trihydric alcohols, and polybasic, preferably dibasic carboxylic acids. Instead of free polycarboxylic acids, the corresponding polycarboxylic acid anhydrides or corresponding polycarboxylic acid esters of lower alcohols or their mixtures may be used for producing the polyesters. The polycarboxylic acids may be aliphatic, cycloaliphatic, aromatic and/or heterocylic and may be substituted, e.g. with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethyl terephthalate and bix-glycol terephthalate. Suitable polyhydric alcohols include e.g. ethylene glycol, propylene-1,2- and -1,3-glycol, butylene-1,4- and 2,3-glycol, hexane-1,6-diol, octane-1,8-diol, neopentyl glycol, cyclohexane dimethanol (1,4-bis-hydroxymethyl cyclohexane), 2-methyl-1,3-propanediol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl groups in end positions. Polyesters of lactones such as ε-caprolactone or hydroxycarboxylic acids such as ω-hydroxycaproic acid may also be used.

Any suitable hydroxyl polyether with at least one, generally two to eight and preferably two or three hydroxyl groups which may be used to make component (c) according to the invention are also known per se and may be prepared e.g. by polymerizing epoxides such as ethylene oxide, propylene oxide, butylene oxide, tetrahydrofuran, styrene oxide or epichlorohydrin, each with itself, e.g. in the presence of $BF_3$, or by addition of these epoxides, optionally as mixtures or successively, to starting components which contain reactive hydrogen atoms such as alcohols or amines, e.g. water, ethylene glycol, propylene glycol-(1,3) or -(1,2), trimethylolpropane, 4,4'-dihydroxy-diphenylpropane, aniline, ammonia, ethanolamine, or ethylene diamine. Sucrose polyethers such as those described e.g. in German Auslegeschrfit Nos. 1,176,358 and 1,064,938 may also be used according to the invention. It is frequently preferred to use polyethers which contain predominantly primary OH-groups (up to 90% by weight, based on all the OH-groups in the polyether). Polyethers modified with vinyl polymers of the kind which can be obtained e.g. by polymerizing styrene or acrylonitrile in the presence of polyethers (U.S. Pat. Nos. 3,383,351; 3,304,273; 3,523,093 and 3,110,695 and German Pat. No. 1,152,536), and polybutadienes which contain OH-groups are also suitable.

Suitable polythioethers are in particular the condensation products of thiodiglycol with itself and/or with other glycols, dicarboxylic acids, formaldehyde, amino-carboxylic acids or amino alcohols. The products obtained are polythio mixed ethers, polythioether esters or polythioether ester amides, depending on the co-component.

Suitable polyacetals are e.g. the compounds which can be prepared from glycols such as diethylene glycol, triethylene glycol, 4,4'-dioxethoxy-diphenyl dimethylmethane, hexanediol and formaldehyde. Polyacetals suitable for the invention may also be prepared by polymerizing cyclic acetals.

Suitable polycarbonates with hydroxyl groups are of the kind known per se which can be obtained e.g. by reacting diols such as propane-1,3- diol, butane-1,4-diol and/or hexane-1,6-diol or diethylene glycol, triethylene glycol or tetraethylene glycol with diaryl carbonates such as diphenyl carbonate or phosgene.

The polyester amides and polyamides also include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups may also be used, as well as modified or unmodified natural polyols such as castor oil, carbohydrates or starch. Addition products of alkylene oxides to phenolformaldehyde resins or to urea-formadehyde resins may also be used according to the invention.

Representatives of these compounds which may be used according to the invention have been described e.g. in High Polymers, Volume XVI, "Polyurethanes, Chemistry and Technology" published by Saunders-Frisch, Interscience Publishers, New York, London, Volume I, 1962, pages 32–42 and pages 44–54 and Volume II, 1964, pages 5–6 and 198–199 and Kunststoff-Handbuch Volume VII, Vieweg-Hochtlen, Carl-Hanser-Verlag, Munich 1966, e.g. on pages 45 to 71.

The prepolymers frequently have a viscosity of more than 2000cP and occasionally up to 100,000 cP at 25° C.

In cases where such high viscosities are a disadvantage for working the product, the viscosity may be reduced by adding low-viscosity isocyanates or by adding inert solvents.

According to the invention, the aqueous solutions of silicates referred to are the solutions of sodium silicate and/or potassium silicate in water which are normally known as water glass. Crude commercial solutions which in addition contain substances such as calcium silicate, magnesium silicate, borates and aluminates may also be used. The proportion of $Me_2O$ to $SiO_2$ is not critical and may vary within the usual limits but is preferably 4:0.2. If the water content of the plastics obtained by the reaction with the organic components is of minor importance, either because it has no undesirable effects or because it can easily be removed by drying, then a neutral sodium silicate may well be used, which can be prepared in the form of 25–35% solutions. It is preferred, however, to use 32–54% silicate solutions, and these can only be obtained at a viscosity below 500 poises, as is necessary for problem-free working with the solutions, if they are sufficiently alkaline. Ammonium silicate solutions may also be used but are less advantageous. The solutions may be true solutions or colloidal solutions.

Silica sols which may have an alkaline or acid pH may also be used; they should have solids contents of 20–50%. Silica sols are generally used in combination with aqueous silicate solutions.

The choice of concentration depends mainly on the desired end product. Compact materials or materials with closed cells are preferably produced with concentrated silicate solutions which if necessary are adjusted to a lower viscosity by addition of alkali metal hydroxide. Solutions with concentrations of 40–70% by weight can be prepared in this way. On the other hand, to produce open-celled light-weight foams, it is preferred to use silicate solutions with concentrations of 20–45% by weight in order to obtain low viscosities, sufficiently long reaction times and low unit weights. Silicate solutions with concentrations of 20–45% are also preferred when substantial quantities of finely divided inorganic fillers are used.

The organic compounds (component c) used according to the invention which contain at least one hydrogen atom capable of reacting with isocyanate as well as at least one ionic and/or non-ionic-hydrophilic group are compounds of the kind which are used for example for preparing ionic and/or nonionic polyurethane dispersions. In addition, one may also use compounds of the kind which merely contain an ionic and/or nonionic-hydrophilic center at any point in the molecule. Such a center increases the compatibility of a compound with water compared with that of a comparable product which does not contain the ionic and/or hydrophilic center.

By reactive groups which are capable of reacting with isocyanate in a polyaddition reaction are meant, apart from amino groups, thiol groups or carboxyl groups, preferably hydroxyl groups of the kind which are known per se as part of organic compounds for the production of homogeneous and of cellular polyurethanes.

The following groups are given as specific examples of suitable ionic groups:

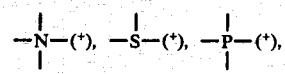

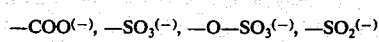

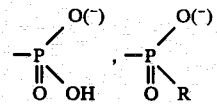

$R = C_1-C_{14}$-alkyl, $C_5-C_{10}$-cycloalkyl, $C_6-C_{10}$-aryl.

The term ionic groups as used here refers not only to the above mentioned preformed salt groups but also to groups which are capable of forming salt groups in the presence of alkali metal silicate, e.g.

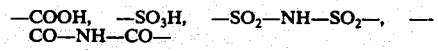

and phenolic OH-groups.

The organic compound used may, of course, contain several of the above mentioned groups. Betaines which contain an anionic group and a cationic group in one and the same molecule or symplexes which contain both anionic and cationic compounds may also be used.

Among the ion-forming groups, the following are particularly preferred:

Of these groups, the tert. amino group must be converted into a quaternary ammonium group before it is combined with the alkali metal silicate solution. This can be achieved by means of alkylating agents but also with the aid of inorganic or organic acids.

The following are given as examples of suitable compounds which contain both at least one hydrogen atom capable of reacting with isocyanate and at least one ionic group:

1. Reaction products of
   a. compounds which contain at least one basic nitrogen atom and at least one hydrogen atom capable of reacting with isocyanate and
   b. alkylating agents.

The following are examples of suitable compounds which contain at least one basic nitrogen atom and at least one hydrogen atom capable of reacting with isocyanate: mono-, bis- and polyoxalkylated aliphatic, cycloaliphatic, aromatic and heterocyclic primary amines such as N-methyl-diethanolamine, N-ethyl-diethanolamine, N-propyl-diethanolamine, N-isopropyldiethanolamine, N-butyl-diethanolamine, N-isobutyl-diethanolamine, N-oleyl-diethanolamine, N-stearyl-diethanolamine, oxethylated coconut fatty amines, N-allyl-diethanolamine, N-methyl-diisopropanolamine, N-ethyl-diisopropanolamine, N-propyl-diisopropanolamine, N-butyl-diisopropanolamine, N-cyclohexyl-diisopropanolamine, N,N-dioxethyl aniline, N,N-dioxethyl-toluidine, N,N-dioxethyl-α-aminopyridine, N,N'-dioxethyl-piperazine, dimethyl-bis-oxethyl hydrazine, N,N'-bis-(β-hydroxy-ethyl)-N,N'-diethyl-hexahydro-p-phenylene diamine, N-β-hydroxyethyl piperazine, polyalkoxylated amines such as propoxylated methyl-diethanolamine; compounds such as N-methyl-N,N-bis-γ-aminopropylamine, N-(γ-aminopropyl)-N,N'-dimethylethylene diamine, N-(γ-aminopropyl)-N-methylethanolamine, N,N'-bis-(γ-aminopropyl)-N,N'-dimethyl-ethylene diamine, N,N'-bis-(γ-aminopropyl)-piperazine, N-(β-aminoethyl)-piperazine, N,N'-bis-oxethyl-propylene diamine, 2,6-diaminopyridine, diethanolamino-acetamide, diethanolamino propionamide, N,N-bis-oxethyl-phenyl-thiosemicarbazide, N,N-bis-oxethyl-methylsemicarbazide, p,p'-bis-aminomethyl-dibenzyl methylamine, 2,6-diamino-pyridine and the like.

Compounds which contain halogen atoms capable of being quaternized or R—SO₂O-groups include, for example, glycerol-α-chlorohydrin, glycerol monotosylate, pentaerythritol-bis-benzene sulphate, glycerol-monomethane sulphonate, adducts of diethanolamine and chloromethylated aromatic isocyanates or aliphatic halogenated isocyanates such as N,N-bis-hydroxyethyl-N'-m-chloromethyl-phenyl-urea, N-hydroxyethyl-N'-chlorohexyl urea, glycerol-monochloroethyl-urethane, bromoacetyldipropylene triamine, chloroacetic acid diethanolamide and the like.

Trifunctional or higher functional components such as triethanolamine, diethylene triamine or dipropylene triamine may be used. Branched polyesters or polyethers which contain basic nitrogen may also be used, provided they contain hydrogen atoms which are reactive with isocyanate.

Monofunctional compounds which contain only one group which is reactive with isocyanates may also be included, e.g. saturated or unsaturated fatty alcohols, fatty amines or fatty acids, resinic acids, N,N-dimethylethanolamine, N,N-diethyl-ethanolamine, 1-dimethylaminopropanol-(2), N-oxethylmorpholine, N-methyl-N-β-hydroxyethyl aniline, N-oxethylpiperidine, α-hydroxyethyl-pyridine, γ-hydroxyethyl-quinoline, N,N-dimethyl hydrazine, N,N-dimethyl-ethylene diamine, 1-diethylamino-4-aminopentane, α-aminopyridine, 3-amino-N-ethyl carbazol, N,N-dimethylpropylene-diamine, N-amino-propyl-piperidine, N-aminopropyl-morpholine, N-aminopropyl-ethylene imine, 1,3-bis-piperidino-2-aminopropane and the like.

The following are examples of monofunctional alkylating agents which may be used for converting the basic reactants into the salt form: methyl chloride, methyl bromide, methyl iodide, ethyl bromide, propyl bromide, butyl bromide, dimethyl sulphate, diethyl sulphate, methyl chloromethyl ether, methyl-1,2-dichloroethyl ether, ethyl chloromethyl ether, benzyl chloride, benzyl bromide, p-chlorobenzyl chloride, trichlorobenzyl chloride, p-nitrobenzyl chloride, ethylene chlorohydrin, ethylene bromohydrin, epichlorohydrin, ethylene oxide, propylene oxide, styrene oxide, benzene-, toluene- and naphthalene-sulphonic acid ester, ω-bromoacetophenone, dinitrochlorobenzene, α-chloropentenamide, chloroacetic acid and its esters and amides, chloromethyl-dimethyl-ethoxysilane, pentamethyl-bromomethyl-disiloxane, glycol monobromoacetic acid ester, glycerol monochloroacetic acid ester, bromoethyl isocyanate, chloromethyl naphthalene, 3-methyl-3-hydroxymethyl-oxetan-methane sulphonate, phenyl ethyl bromide, p-2-bromoethylbenzoic acid, 5-chloromethyl-furan-2-carboxylic acid, dichloroisopropyl ester of ethyl phosphonous acid, bromoethyl ester of acetoacetic acid, propane sultone, butane sultone and the like. Further examples may be found in DAS No. 1,205,087.

Quaternization may also be carried out with cyanogen chloride or cyanogen bromide. Epoxides are used as quaternizing agents in combination with water and/or an acid.

Polyfunctional alkylating agents are also suitable e.g. 1,4-dibromobutane, p-xylylene-dichloride, 1,3-dimethyl-4,6-bis-chloromethyl-benzene, methylene-bis-chloroacetamide, hexamethylene-bis-bromoethyl urethane, adducts of 2–3 mols of chloroacetamide with 1 mol of di- or triisocyanate and the like. Further examples of suitable polyfunctional alkylating agents may be found in Dutch Auslegeschrift No. 67/03743.

Inorganic and organic acids may also be used for salt formation, including those which also have a chain-building function such as sulphurous acid, sulphuric acid, hypophosphorous acid, phosphinic acids, phosphonous acids and phosphonic acids, glycolic acid, lactic acid, succinic acid, tartaric acid, oxalic acid, phthalic acid, trimellitic acid and the like. Further examples of acids may be found in German Pat. No. 1,178,586 and in U.S. Pat. No. 3,480,592. Acids such as hydrochloric acid, fluoroboric acid, amidosulphonic acid, phosphoric acid and its derivatives, tartaric acid, oxalic acid, lactic acid, acetic acid, acrylic acid and the like which have the effect of substantially increasing the hydrophilic character of the organic compounds are particularly preferred. Various salt-binding agents may also be used in combination.

The above mentioned compounds which contain reactive hydrogen atoms may, provided they contain basic nitrogen atoms or divalent sulphur atoms, be used in combination with alkylating agents or acids to produce cationic organic starting compounds.

Cationic starting compounds may accordingly be prepared from compounds which contain reactive hydrogen atoms, reactive halogen atoms or ester groups of strong acids in combination with tertiary, secondary or primary amines, organic sulphides or phosphines.

Anionically modified starting compounds may be similarly used.

Below are given examples of compounds which may be used as starting materials which contain at least one hydrogen atom which is reactive with isocyanate groups and at least one anionic salt group capable of forming anionic salts, these compounds being optionally used as mixtures:

1. hydroxy acids and mercapto acids such as glyceric acid, glycolic acid, thioglycolic acid, lactic acid, trichlorolactic acid, malic acid, dihydroxymaleic acid, dihydroxyfumaric acid, tartaric acid, dihydroxytartaric acid, mucic acid, saccharic acid, citric acid, aliphatic, cycloaliphatic, aromatic and heterocycic mono- and diaminocarboxylic acids such as glycine, α- and β-alanine, 6-aminocaproic acid, 4-aminobutyric acid, sarcosine, methionine, leucine, isoleucine, serine, valine, ornithine, histidine, lysine, proline, phenyl alanine, threonine, cysteine, asparagine, glutamine, arginine, aspartic acid, glutamic acid, oxaluric acid, anilidoacetic acid, anthranilic acid, 2-ethylaminobenzoic acid, 3-aminobenzoic acid, 4-aminobenzoic acid, N-phenylaminoacetic acid, 3,4-diaminobenzoic acid, 5-aminobenzene-dicarboxylic acid and the like;

2. aminosulphonic acids: amidosulphonic acid, hydroxyamine monosulphonic acid, hydrazine disulphonic acid, sulphanilic acid, N-phenylamino-methanesulphonic acid, 4,6-dichloroanilinesulphonic acid-(2), phenylene diamine-(1,3)-disulphonic acid-(4,6), N-acetyl naphthylamine-(1)-sulphonic acid-(3), naphthylamine-(1)-sulphonic acid, naphthylamine-(2)-sulphonic acid, naphthylamine disulphonic acid, naphthylamine trisulphonic acid, 4,4'-di-(p-aminobenzoyl-amino)-diphenyl-urea-disulphonic acid-(3,3'), taurine, methyl taurine, butyl taurine, 3-aminobenzoic acid-(1)-sulphonic acid-(5), 3-amino-toluene-N-methanesulphonic acid, 6-nitro-1,3-dimethyl benzene-4-sulphamic acid, 4,6-diaminobenzene-disulphonic acid, 4,6-diaminobenzenedisulphonic acid-(1,3), 2,4-diaminotoluene-sulphonic acid-(5), 4,4'-diaminodiphenyl-disulphonic acid-(2,2'), 2-aminophenol, sulphonic acid-(4), 4,4'-diaminodiphenylether-sulphonic acid-(2), 2-aminoanisol-N-methane sulphonic acid, 2-amino-diphenylamine-sulphonic acid, ethylene glycol sulphonic acid, 2,4-diaminobenzene sulphonic acid and the like;

3. organic phosphorus compounds such as derivatives of phosphinic acid, phosphonous acids, phosphonic acids and phosphoric acids and esters of phosphorous and phosphoric acid and their thioanalogues, e.g. bis-(α-hydroxyisopropyl)-phosphinic acid, hydroxyalkane phosphonic acid, phorphorous acid bis-glycol ester, phosphorous acid bis-propylene glycol ester, phosphoric acid bis-glycol ester, phosphoric acid bis-propylene glycol ester and the like;

4. among the hydroxy-, mercapto- and aminocarboxylic acids and sulphonic acids and polycarboxylic acids and sulphonic acids may also be included the (optionally saponified) addition products of unsaturated acids such as acrylic acid or methacrylic acid and unsaturated nitriles such as acrylonitrile, addition products of cyclic dicarboxylic acid anhydrides such as maleic, phthalic or succinic acid anhydrides, addition products of sulphocarboxylic acid anhydrides such as sulphoacetic or o-sulphobenzoic acid anhydride, addition products of lactones such as β-propiolactone or γ-butyrolactone, addition products of the reaction products of olefines and sulphur trioxide such as carbyl sulphate, addition products of epoxycarboxylic acids and sulphonic acids such as glycidic acid or 2,3-epoxypropanesulphonic acid, addition products of sultones such as 1,3-propane sultone, 1,4-butane sultone or 1,8-naphthosultone and addition products of disulphonic acid anhydrides such as benzene disulphonic acid-(1,2)-anhydride with aliphatic and aromatic amines such as 1,2-ethylene diamine, 1,6-hexamethylene diamine, the isomeric phenylene diamines, diethylene triamine, triethylene triamine, tetraethylene pentamine, pentaethylene hexamine, hydrazines (optionally alkylated), ammonia, amino alcohols such as hydroxy alkylated amines and hydrazines such as ethanolamine, diethanolamine, triethanolamine, ethanol ethylene diamine or ethanol hydrazine, alcohols such as ethylene glycol, propylene glycol, 1,3- and 1,4-butanediol, 1,6-hexanediol sand polyhydric alcohols such as trimethylolpropane, glycerol or hexanetriol; and addition products (optionally hydrogenated) of epoxy compounds and ethylene imine compounds such as ethylene oxide, propylene oxide, butylene oxide, styrene oxide, ethylene imine or unsaturated nitriles such as acrylonitrile with aliphatic and aromatic aminocarboxylic acids and aminosulphonic acids; the reaction products of hydroxyalkane sulphonic acids, halogenated carboxylic acids or halogenated sulphonic acids with optionally alkylated hydrazines such as hydrazinoacetic acid, hydrazinoethane sulphonic acid or hydrazinomethane sulphonic acid; the saponified addition products of cyan hydrines with hydrazines such as 1,2-hydrazine-bis-isobutyric acid; and the addition products of sodium hydrogen sulphite with olefinically unsaturated compounds such as allyl alcohol, maleic acid, maleic acid-bis-ethylene glycol ester, maleic acid-bis-propylene glycol ester or the like;

5. hydrazinocarboxylic acids such as hydrazinodicarboxylic acids;

6. higher-molecular weight condensates such as polyesters which contain carboxyl groups.

The following are examples of suitable compounds for conversion into the salt form in order to obtain anionic starting compounds:

1. organic bases such as monofunctional primary, secondary and tertiary amines, for example methylamine, diethylamine, triethylamine, trimethylamine, dimethylamine, ethylamine, tributylamine, pyridine, aniline, toluidine, alkoxylated amines such as ethanolamine, diethanolamine, triethanolamine, methyl diethanolamine, dimethyl aminoethanol or oleyl diethanolamine, and polyfunctional polyamines in which the individual amino groups may differ from each other in their basicity, for example the polyamines obtained by hydrogenating the addition products of acrylonitrile and primary or secondary amines, or peralkylated or partially alkylated polyamines such as N,N-dimethyl ethylene diamine, compounds such as α-aminopyridine, N,N-dimethyl hydrazine or the like;

2. inorganic bases, compounds which are basic in reaction or split off bases, such as ammonia, monovalent metal hydroxides, carbonates and oxides such as sodium hydroxide or potassium hydroxide. Various salt-forming agents may also be combined; furthermore, the carboxyl groups may be only partly neutralized.

The anionically modified starting compounds of course need not necessarily be neutralized. Salt-formation in such cases does not take place until the compounds are mixed with the water glass.

Organic starting compounds which contain at least one nonionic-hydrophilic group in addition to at least one hydrogen atom which is reactive with isocyanate are also suitable according to the invention.

The nonionic-hydrophilic groups used are mainly hydrophilic polyether groups.

Polyether groups which have been synthesized from ethylene oxide and propylene oxide are preferred.

Particularly suitable starting compounds which contain at least one nonionic-hydrophilic group in addition to a hydrogen atom which is reactive with isocyanate are polyethers which have been obtained from alcohols with a functionality of 1–3 and ethylene oxide and/or propylene oxide and which contain OH end groups with at least 10% ethylene oxide blocks.

Polyether compounds or compounds with polyether groups which have been prepared by different methods may, of course, also be used according to the invention provided they contain hydrophilic groups.

Monofunctional polyethers based on monohydric alcohols with a molecular weight of about 32 to about 300 and ethylene oxide are quite particularly preferred. The ethylene oxide content in the polyether should preferably be at least 10% by weight. Nonionic-hydrophilic compounds suitable for the purpose of the invention also include polycarbonates based on ethylene glycol, propylene glycol or tetraethylene glycol.

Compounds which contain a hydrophilic polyester segment, e.g. of triethylene glycol or diethylene glycol and succinic acid or oxalic acid are also suitable. These segments may be destroyed in the course of the subsequent reaction with water glass with the result that the inorganic component hardens and the organic component is rendered hydrophobic.

The hydrophilic center may also be introduced into the organic compound by incorporating a glycol such as triethylene or tetraethylene glycol.

The hydrophilic group may be contained in the main chain or in the side chain of the organic compounds.

In addition to the hydrophilic-nonionic segment there may also be an ionic center either in the same or in another molecule. The morphology and interface chemistry of the diphasic plastics according to the invention can be influenced as desired by using such ionic-nonionic combinations.

The organic compounds (c) required for the process according to the invention must cause at least one of the following conditions to be fulfilled when they are mixed with the organic polyisocyanate and aqueous silicate solution and/or aqueous silica sol:

a. formation of finely divided oil-in-water emulsions or
b. formation of finely divided water-in-oil emulsions.

The organic compound (c) in combination with the polyisocyanate should not be so hydrophilic that the conbination is infinitely soluble in the inorganic aqueous phase.

Production of the inorganic-organic plastics according to the invention is simple to carry out. All that is required is to mix the three starting components homogeneously, whereupon hardening of the mixture in most cases takes place immediately. The mixtures are typical finely divided emulsions or sols. They are not optically clear but in most cases opaque or milky-white. The xerosol subsequently obtained appears to be preformed in them. When they are mixed, a prepolymer is formed in situ at least partly by the reaction of the isocyanate component with the organic component (c). Due to its ionic and/or nonionic-hydrophilic groups, this prepolymer is capable of forming finely divided emulsions or sols with the aqueous silicate solution. The reaction of the isocyanate with the isocyanate-reactive hydrogen atom of organic compound (c) may be catalytically assisted, especially if alkaline silicate solutions are used.

Mixing of the components may be carried out according to the invention either by separately measuring out the three components and mixing them simultaneously or by mixing silicate component (b) with organic compound (c) and then adding the resulting mixture to the isocyanate component.

In cases where a preliminary mixture of silicate component (b) and organic compound (c) is first prepared, care must be taken to insure that the organic compound (c) does not bring about hardening or precipitation of the silicate component before it is mixed with the isocyanate.

The mixture of all three components is not stable. The so-called pot life during which the mixture remains in a workable state depends mainly on the chemical nature of the reactive groups of the ionic or nonionic-hydrophilic organic compound (c), on the total quantity of silicate hardener liberated and on the concentration of the silicate solution. It varies from 0.2 seconds to about 15 hours.

A pot life of about 1 second to about 20 minutes is preferred.

It follows that mixing is generally carried out immediately before the molding or shaping process.

It is distinctly surprising that, for example, the reaction between the three starting components in most cases runs practically to completion within a few seconds and no bubbles are formed in the absence of volatile compounds. This means that within this short reaction time all the carbon dioxide liberated by the reaction of the NCO-groups with water diffuses through the interface into the aqueous phase, thereby demonstrating the extremely large area of the phase interface, which is a major feature of the process according to the invention and contributes to the surprising properties of the products.

Production of the new composite materials of polymer and silica gel may in principle be carried out by known technological processes, e.g. those employed for producing cast or foamed polyurethanes. Since, however, the pot life is in most cases short and the reaction often proceeds spontaneously at −20° C, there are often limitations to the possibilities of employing a discontinuous method, which in fact is practically restricted to the production of small shaped articles. The components are preferably continuously mixed in a mixing chamber with a low residence time by the usual methods employed for producing polyurethane foams and then hardened in a shaping operation. This may be done, for example, by pouring the liquid or pasty mixtures into molds or applying them to surfaces or filling them into cavities, joints or cracks and the like.

When mixing is carried out, the proportion by weight of total organic content to silicate content may vary within wide limits, e.g. between 99:1 and 1:99. Preferably, the ratio of organic constituent to silicate content is between 98:2 and 5:95. Optimum use properties, in particular high strength, elasticity, dimensional stability under heat and flame resistance are obtained when mixing ratios of organic content to silicate content are between 70:30 and 20:80.

This range is therefore particularly preferred.

The whole organic component should preferably have such a composition that, based on the isocyanate component (a), the ionic group of component (c) amounts to 2–200 milliequivalents per 100 of component (a) and/or the nonionic-hydrophilic group of component (c) amounts to 1–50 percent by weight, based on component (a).

From the proportions indicated above, it will be seen that the proportion of total organic component to silicate solution used for producing this composite material of polymer and silica gel is not critical. This is particularly advantageous because in continuous methods of production using delivery apparatus and mixing chambers it obviates the necessity for exact measurement of the quantities, and sturdy delivery devices such as gearwheel pumps may therefore be used.

The activity of the reaction mixture can be adjusted mainly by the quantity and nature of the ionic and/or non-ionic-hydrophilic groups. Products with a low silicate content, e.g. between 1 and 30%, are preferably produced in cases where the organic polymer properties of the product are required to predominate and the silicate content is required, for example, to improve the binding of the fillers, in particular the so-called inactive fillers such as chalk, heavy spar, gypsum, anhydrite, clay or kaolin.

Small quantities of silicate solutions are indicated also where an isocyanate prepolymer is to be hardened with water to form a non-porous, homogeneous plastic. Since, as is well known, the reaction between NCO-groups and water is accompanied by the evolution of $CO_2$, it is practically restricted to the production of foams. Pore formation can also not be prevented when water glass solutions are used in conventional elastomer formulations, due to the evolution of $CO_2$. The reaction of the three starting components used according to the invention, on the other hand, leads to a product with considerably reduced pore formation, and if the three components are used in suitably adjusted proportions, which can easily be determined in empirically, a completely pore-free material which is chain lengthened or crosslinked with water is obtained. High-quality homogeneous polyureas in this way become available by a simple, solvent-free direct process. The desired reaction velocity can easily be adjusted by varying the ionic and/or nonionic-hydrophilic group content.

A high silicate content, e.g. 80–99%, is desired in cases where the properties of an inorganic silicate plastic are the most important, in particular high temperature resistance and complete incombustibility. In that case, the function of the isocyanate component is that of a non-volatile hardener whose reaction product is a high-molecular weight polymer which reduces the brittleness of the product. This elasticizing effect makes these combinations of polyisocyanate and organic compound (c) superior to the usual acid-based hardeners. The hardening times generally increase as the hydrophilic group content decreases. Combinations of this kind, and especially those which do not have a sufficient hardening effect, may, of course, be used in combination with hardeners which split off acids. In that case, the organic constituents act mainly as elasticizing component.

Mixtures of the three starting components which contain more than 30% of water are preferably used for producing thin layers such as surface coatings or putties, adhesive bonds or grouting compositions and particularly for producing foams.

When producing foams by the process according to the invention it is advisable to use blowing agents, even when using NCO-prepolymers which give rise to the evolution of carbon dioxide. The blowing agents which are suitable for this purpose are inert liquids boiling within a range of −25° to +80° C and preferably −15° to +40° C. They are preferably insoluble in the silicate solution and they are used in quantities of 0–50% by weight, preferably 2–30% by weight, based on the reaction mixture.

Suitable organic blowing agents are e.g. acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as nitrogen, for example azo compounds such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g. on pages 108 and 109, 453 to 455 and 507 to 510.

Catalysts which promote the reaction of isocyanates with reactive hydrogen are also often used according to the invention in catalytic amounts. Catalysts known per se may be used, e.g. tertiary amines such as triethylamine, tributylamine, N-methyl-morpholine, N-ethylmorpholine, N-cocomorpholine, N,N,N',N'-tetramethyl-ethylene diamine, 1,4-diaza-bicyclo-(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenyl ethylamine, 1,2-dimethyl imidazole or 2-methyl imidazole.

Suitable tertiary amine catalysts with hydrogen atoms which are reactive with isocyanate groups include e.g. triethanolamine, triisopropanolamine, N-methly-diethanolamine, N-ethyl-diethanolamine, N,N-dimethylethanolamine and their reaction products with alkylene oxides such as propylene oxide and/or ethylene oxide.

Silaamines which have carbon-silicon bonds as described e.g. in German Pat. No. 1,229,290 may also be used as catalysts, e.g. 2,2,4-trimethyl-2-silamorpholine or 1,3-diethylaminomethyl-disiloxane.

Bases which contain nitrogen, such as tetraalkyl ammonium hydroxides, alkali metal hydroxides such as sodium hydroxide, alkali metal phenolates such as sodium phenolate or alkali metal alcholates such as sodium methylate may also be used as catalysts. Hexahydrotriazines are also suitable catalysts.

Organic metal compounds may also be used as catalysts according to the invention, particularly organic tin compounds.

The organic tin compounds used are preferably tin(II) salts of carboxylic acids such as tin(II)-acetate, tin(II)-octoate, tin(II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g. on pages 96 to 102.

The catalysts are generally used in any catalytic amount, preferably in a quantity of between about 0.001 and 10% by weight, based on the quantity of polyisocyanate.

Surface-active additives (emulsifiers and foam stabilizers) may also be used according to the invention. Suitable emulsifiers include e.g. the sodium salts of ricinoleic sulphonates or of fatty acids or salts of fatty acids with amines such as oleic acid diethylamine or stearic acid diethanolamine. Alkali metal or ammonium salts of sulphonic acids, for example of dodecyl benzene sulphonic acid or dinaphthyl methane disulphonic acid or of fatty acids such as ricinoleic acid or of polymeric fatty acids may also be included as surface-active additives.

The foam stabilizers used are mainly water-soluble polyether siloxanes. These compounds generally have a polydimethyl siloxane group attached to a copolymer of ethylene oxide and propylene oxide. Foam stabilizers of this kind have been described e.g. in U.S. Pat. No. 3,629,308.

Reaction retarders, e.g. substances which are acid in reaction such as hydrochloric acid or organic acids halides, cell regulators known per se such as paraffins or fatty alcohols or dimethyl polysiloxanes, pigments, dyes, flame-retarding agents known per se such as trischloroethyl phosphate or ammonium phosphate and polyphosphate, stabilizers against aging and weathering, plasticizers, fungistatic and bacteriostatic substances and fillers such as barium sulphate, kieselguhr, carbon black or whiting may also be used according to the invention.

Other examples of surface-active additives, foam stabilizers, cell regulators, reaction retarders, stabilizers, flame-retarding substances, plasticizers, dyes, fillers and fungistatic and bacteriostatic substances which may also be used according to the invention and details concerning their use and mode of action have been described in Kunststoff-Handbuch, Volume VI, published by Vieweg and Hochtlen, Carl-Hanser-Verlag, Munich 1966, e.g. on pages 103 to 113.

Additives which even further improve the fire characteristics of these plastics are particularly important and therefore it is preferred to include them. Apart from the usual flame-retarding agents, these include in particular halogenated paraffins and inorganic salts of phosphoric acid.

Production of foams according to the invention is basically carried out by mixing the above described reactants in one or several stages in a discontinuously or continuously operating mixing apparatus and then leaving the mixture to foam up and solidity, in most cases outside the mixing apparatus in molds or on suitable supports. The required reaction temperature of between about 0° and 200° C, preferably between 30° and 160° C, can be achieved either by preheating one or more of the reactants before the mixing process or by heating the mixing apparatus itself or by heating the reaction mixture after it has been prepared. One may, of course, also use combinations of these or other methods for adjusting the reaction temperature. In most cases, sufficient heat is evolved during the reaction to enable the reaction temperature to rise above 50° C after onset of the reaction or of foaming.

The reactants may, however, also be reacted by the known one-step process, prepolymer process or semi-prepolymer process, often using mechanical devices such as those described in U.S. Pat. No. 2,764,565. Details concerning apparatus which may also be used according to the invention have been described in Kunststoff-Handbuch, Volume VI, published by Vieweg and Hochtlen, Carl-Hanser-Verlag, Munich 1966, e.g. on pages 121 to 205.

Exceptionally high-grade plastics are obtained by the process according to the invention if hardening is carried out at temperatures above 20° C, in particular 50°-200° C. So much heat is liberated even without the external supply of heat, especially in combinations of polyisocyanates which contain 10-40% of NCO-groups and alkali metal silicate solutions, that the water begins to evaporate. Temperatures above 150° C are easily reached in the interior of foam blocks.

It appears that under these conditions particularly marked interactions take place between the inorganic and organic polymer and a particularly firm bond is formed between them so that the resulting materials are not only rock-hard but at the same time also highly elastic and therefore quite exceptionally shock-resistant and resistant to breakage.

If the quantity of heat evolved in the reaction between the components is not sufficient, mixing may easily be carried out at a higher temperature, e.g. between 40° and 100° C. In special cases, mixing may also be carried out above 100° C, up to about 150° C under pressure, so that when the material is discharged from the apparatus, the release of pressure is accompanied by foaming.

If production of the foam is carried out at an elevated temperature, one may, of course, also use higher boiling blowing agents such as hexane, dichloroethane, trichloroethane, carbon tetrachloride or light petrol. On the other hand, the water contained in the mixture may take over the function of blowing agent. Fine metal powders such as powders of calcium, magnesium, aluminum or zinc may function as blowing agents due to the evolution of hydrogen if the water glass is sufficiently alkaline, and these powders at the same time have a hardening and strengthening effect on the product.

Foams may also be produced with the aid of inert gases, particularly air. For example, one of the reactants may be foamed up with air and then mixed with the other components. Mixing of the components may also be achieved e.g. with the aid of compressed air which results in the direct formation of a foam which then hardens when shaped.

For any given formulation of components, the properties of the foams obtained, e.g. their density in the moist state, depends to some extent on the details of the mixing process such as the nature and speed of the stirrer, the form of the mixing chamber and the selected reaction temperature when foaming is started. This density may vary from about 0.005 to 1.2 g/cm$^3$ and in most cases moist fresh foams with densities of between 0.02 and 0.8 g/cm$^3$ are obtained. When dry, the foams may have an open-celled or closed-celled character. In most cases, they are substantially open-celled with densities of between 0.01 and 0.6 g/cm$^3$.

The characteristics of the reaction mixtures provide many possible applications for the process according to the invention and hence many fields of application, some of which will be outlined below. The possibility of either leaving the water in the hardened mixtures as a desirable constituent in the foam or of protecting the foam against loss of water by suitable coating or laminating or of partly or completely removing the water by suitable drying processes, e.g. in a heating cupboard or with hot air, infrared heating, ultra-sound or high frequency, may be adapted to the desired fields of application from case to case.

The reaction mixture which contains blowing agent may, for example, be spread-coated on warm or cold supports or supports exposed to IR or HF radiation, or after passing the mixing apparatus the reaction mixture may be sprayed on these supports with the aid of compressed air or by the airless spraying process. The reaction mixture then foams up on the supports and hardens to form a filling or insulating or moisture proofing coating. The foaming reaction mixture may also be forced, cast or injection-molded into cold or heated molds and in these molds, which may be relief molds, solid molds or hollow molds, it may be left to harden, optionally under pressure and at room temperature or temperatures of up to 200° C, optionally using a centrifugal casting process. At this stage, reinforcing elements in the form of inorganic and/or organic or metal wires, fibers, non-woven webs, foams, fabrics, supporting structures etc. may be incorporated. This may be achieved, for example, by the fibrous web impregnation process or by processes in which the reaction mixtures and reinforcing fibers are together applied to the mold, for example by means of a spray apparatus. The molded products obtainable in this way may be used as building elements, e.g. in the form of optionally foamed sandwich elements which may be used directly or subsequently laminated with metal, glass, plastics, etc., the good fire characteristics of the material in the moist or dry state being a considerable advantage in these elements. On the other hand, the products may be used as hollow bodies, e.g. as containers for goods which are required to be kept moist or cool, or they may be used as filter materials or exchangers, as catalyst carriers or carriers of other active substances, as decoration elements, furniture components and cavity fillings. They may also be used as heavy-duty lubricants and coolants or carriers of such substances, e.g. in metal extrusion presses. Their use in model and mold building and in the production of molds for metal casting may also be considered.

One preferred method consists of letting the foaming process proceed hand in hand with hardening, for example by preparing the reaction mixture in a mixing chamber and at the same time adding the readily volatile blowing agent such as dichlorodifluoromethane, trichlorofluoromethane, butane, isobutylene or vinyl chloride so that with suitable choice of the mixing temperature the reaction mixture foams up on leaving the mixing chamber due to evaporation of the blowing agent and at the same time hardens due to the action of the hardener so that the resulting foam, which may still contain emulsifiers and foam stabilizers and other auxiliary agents, becomes fixed. Furthermore, the reaction mixture which initially is still a thin liquid may be foamed up by introducing gases such as air, methane, $CF_4$ or inert gases, optionally under pressure, this foam being converted into the required form and left to harden. Alternatively, the silicate- or nonionic-hydrophilic prepolymer solution which may contain foam stabilizers such as wetting agents, foam-forming agents, emulsifiers and optionally also other organic or inorganic fillers or diluents may be converted into a foam by gasifying it and this foam may then be mixed with the counter components in a mixing apparatus and optionally also with hardener and then left to harden.

According to a preferred method, the organic component (c) is first mixed with the alkali metal silicate solution and optionally activator and/or emulsifier and then mixed with the polyisocyanate to which blowing agent has been added, so that the mixture hardens while foaming up.

Instead of blowing agents, inorganic or organic finely divided hollow particles such as hollow expanded beads of plastics, straw and the like may be used for producing the foams.

The foams obtainable in this way may be used in the dry or moist state, optionally after a compating or tempering process, optionally under pressure, as insulating materials, cavity fillings, packaging materials and building materials which have good solvent resistance and fire characteristics. They may also be used as light-weight building bricks in the form of sandwiches, e.g. with metal covering layers for use in house-building and the construction of motor vehicles and aircraft.

The reaction mixtures may also be foamed up and hardened while in the form of droplets dispersed e.g. in petroleum hydrocarbons or while they are under conditions of free fall. Foam beads are obtained in this way.

Furthermore, organic and/or inorganic particles which are capable of foaming or have already been foamed, e.g. particles of expanded clay, blown glass, wood, popcorn, cork, hollow beads of plastics such as vinyl chloride polymers, polyethylene, styrene polymers or foam particles of these polymers or of other polymers such as polysulphone, polyepoxide, polyurethane, urea formaldehyde, phenol formaldehyde or polyimide polymers may be incorporated in the foaming reaction mixtures while they are still fluid, or heaps of these particles may be premeated with the reaction mixtures to produce insulating materials which have good fire characteristics.

If the blowing agent which is capable of evaporating or liberating gases below a given temperature, for example a hydrocarbon or halogenated hydrocarbon, is added at this temperature to a mixture of aqueous silicate solutions and hardeners optionally also containing inorganic and/or organic additives, then the resulting mixture, which is at first liquid, may be used not only for producing uniform foams or foams which contain other foamed or unfoamed fillers but also for permeating woven and non-woven fibrous webs, grids, constructional parts or other permeable structures with foamed material to produce composite foams which have special properties, e.g. advantageous fire characteristics, which may be used directly as constructional elements in the building industry, furniture industry or motor vehicle and aircraft industries.

The foams according to the invention may also be added in a crumbly form to soil, optionally with the addition of fertilizers and plant-protective agents, to improve the agricultural consistency of the soil. Foams which have a high water content may be used as substrates for the propagation of seedlings, shoots and plants or for cut flowers. The mixtures may be sprayed on terrain which is impassible or too loose, such as dunes or marshes, to strengthen such terrain so that it will be firm enough to walk on within a short time and it will be protected against erosion.

The reaction mixtures proposed here are also important in the case of fire or disaster because they can be sprayed on articles which are required to be protected, and the water contained in them cannot run down the surface of the protected article and cannot evaporate rapidly, so that a very effective protection againt fire, heat or radiation is obtained since the hardened mixture cannot be heated to temperatures much above 100° C so long as it still contains water, and it will absorb IR or nuclear radiation.

Since the mixtures can easily be sprayed, they can be used to form effective protective walls and protective layers in mines in the case of accident or also for routine work, for example by spraying them on fabrics or other surfaces or grids or also simply on walls. A particularly important characteristic for this purpose is that the mixtures harden rapidly.

In the same way, the foaming mixtures may also be used in underground and surface engineering and road building for erecting walls and igloos and for sealing, filling, plastering, priming, insulating and decorating and as coatings, flooring compositions and linings. Their use as adhesives or mortar or casting compounds, optionally with inorganic or organic fillers, may also be considered.

Since the hardened foams produced by the process according to the invention are highly porous after drying, they are suitable for use as drying agents because they are then able to absorb water again. On the other hand, they may be charged with active substances or used as catalyst carriers or filters or absorbents.

Auxiliary agents which may be added to the reaction mixture or introduced subsequently, such as emulsifiers, detergent raw materials, dispersing agents, wetting agents, perfumes or substances which render the mixture hydrophobic enable the properties of foams to be modified as desired in the aqueous or dry state.

On the other hand, the foams in their aqueous or dried or impregnated state may subsequently be lacquered, metallized, coated, laminated, galvanized, vapor-treated, bonded or flocked. Forming operations may be carried out on the shape articles in their aqueous or dried state, for example by sawing, cutting, drilling, planing, polishing or other such processes.

The shaped products, with or without filler, may be further modified in their properties by thermal after-treatment, oxidation processes, heat-pressing, sintering processes or surface melting or other compacting processes.

The molds may suitably be made of inorganic and/or organic foamed or unfoamed material such as metals, e.g. iron, nickel, refined steel or lacquered or teflon coated aluminum or precelain, glass, gypsum, cement, wood or plastics such as PVC, polyethylene, epoxy resins, polyurethanes, ABS, polycarbonate etc.

The foams obtained according to the invention may be surface-dried or in cases where they are substantially permeable structures such as high-grade open-celled foams or porous materials they may also be dried by centrifuging, vacuum treatment, blowing air through them or removing the water by washing dehydrating liquids through them (optionally with heating) or gases such as methanol, ethanol, acetone, dioxane, benzene, chloroform and the like or air, $CO_2$ or steam. The moist or dried shaped products may also be subsequently rinsed or impregnated with aqueous or non-aqueous acid, neutral or basic liquids or gases such as hydrochloric acid, phosphoric acid, formic acid, acetic acid, ammonia, amines, organic or inorganic salt solutions, lacquer solutions, solutions of monomers which have been polymerized or are yet to be polymerized, dye solutions, galvanization baths or solutions with catalysts or catalyst precursors or perfumes.

The new composite plastics are also suitable for use as constructional materials because they have a high tensile strength and compression resistance and are tough and stiff and yet elastic and have a high dimensional stability under heat and flame resistance.

The excellent heat-insulating and sound-absorbing capacity of these foams should also be emphasized, properties which in combination with the excellent fire resistance and heat resistance open up new possibilities of application in the insulating field.

Thus for example high-quality light-weight building panels can be produced either by cutting or sawing continuously foamed blocks or by foaming such panels in molds, optionally under pressure, this molding process being particularly suitable also for complicated shapes. By suitably controlling the operating conditions it is also possible to obtain molded products which have a dense outer skin.

The process according to the invention is particularly suitable, however, for in situ foaming on the building site. Any hollow molds normally produced by shuttering in forms can be obtained by casting and foaming.

Cavities, joints and cracks can also easily be filled with the reaction mixture, a very firm bond being obtained between the materials which are joined together in this way. The reaction mixtures may also be used to produce insulating indoor plasters simply by spraying.

In many cases, the materials obtained can be used instead of wood or hard fiber board. They can be worked by sawing, grinding, planing, nailing, drilling and cutting and are therefore versatile in their uses and possible applications.

Very brittle light-weight foams which can be obtained e.g. with very high silicate contents or by using combinations with brittle organo-polymers, can easily be crushed in suitable apparatus to form dust-fine powders which can be used for many purposes as organo-modified silica fillers. The organo-modification insures good surface interaction with polymers and in some cases also a certain surface thermoplasticity which enables high-quality molding materials to be obtained with which topochemical surface reactions can be carried out by the addition of crosslinking agents.

For many purposes, additional fillers in the form of particulate or pulverulent materials are incorporated in the mixtures of polyisocyanate, organic component (c) and alkali metal silicates and/or silica sols.

The fillers may be solid inorganic or organic substances used e.g. in the form of powder, granulate, wire, fibers, dumb-bell-shaped particles, crystallites, spirals, rods, beads, hollow beads, foam particles, fleeces, woven or knitted fabrics, tapes, foil pieces etc., for example dolomite, chalk, clay, asbestors, basic silicic acids, sand, talcum, iron oxide, aluminum oxide and hydroxides, alkali metal silicates, zeolites, mixed silicates, calcium silicates, calcium sulphates, alumino silicates, cements, basalt wool or powder, glass fibers, carbon fibers, graphite, carbon black, Al-, Fe-, Cu- and Ag-powder, molybdenum sulphide, steel wool, bronze or copper fabrics, silicon powder, expanded clay particles, hollow glass beads, glass powder, lava and pumice particles, wood chips, wood meal, cork, cotton, straw, popcorn, coke and particles of filled or unfilled, foamed or unfoamed, stretched or unstretched organic polymers. Among the numerous suitable organic polymers, the following are mentioned as examples, which may be used, e.g. as powders, granulates, foam particles, beads, hollow beads, particles which can be foamed but have not yet been foamed, fibers, tapes, woven and non-woven webs, etc.: polystyrene, polyethylene, polypropylene, polyacrylonitrile, polybutadiene, polyisoprene, polytetrafluoroethylene, aliphatic and aromatic polyester, malamine urea resins or phenol resins, polyacetal resins, polyepoxides, polyhydantoins, polyureas, polyethers, polyurethanes, polyimides, polyamides, polysulphones, polycarbonates and, of course, any copolymers thereof.

In principle, the composite materials according to the invention may be filled with considerable quantities of fillers without thereby losing their valuable properties. Composite material in which the inorganic component predominates are preferably filled with inorganic fillers to obtain a reinforcing effect while composite materials in which the silicate content predominates are preferably filled with organic fillers.

Particularly preferred fillers are chalk, talcum, dolomite, gypsum, clay, anhydrite glass, carbon and the usual plastics and rubber waste.

Products which have a low silicate content are particularly suitable for producing rapidly hardening high-quality surface coatings which have excellent adherence and wear resistance and for producing elastomers with high strength and high modulus.

For producing surface coatings, adhesive bonds, putties, interlayers, particularly on porous materials, the incorporation of a hardener is frequently unnecessary because the carbon dioxide from the atmosphere is sufficient to act as hardener.

For such applications, it is preferable to use polyisocyanates with a low isocyanate content e.g. less than 5%. The mixtures obtained in this way have a long pot life and can also be applied in thin layers which gradually harden in the course of time.

If only a small quantity of hardener (e.g. $CO_2$) is liberated in the course of the mixing process, a pasty or dough-like material which can be shaped in any way desired is obtained as a result of partial hardening accompanied by increase in viscosity. This material may be worked up into a shaped product and hardened at a later date, e.g. by drying in air or by heating.

Particularly interesting in cases where the materials are to be worked up as putties, fillers which are to be applied by trowel, grouting compositions, mortar and the like is a process of two-stage or multi-stage hardening in which, for example, $CO_2$ is rapidly split off in the first stage, (e.g. by reaction of NCO-groups with water) with the result that the inorganic-organic composite material is brought into a plastic or thermoplastic, workable form, the final hardening then taking place more slowly in a second stage, e.g. by hydrolysis of a high-molecular weight or low-molecular weight ester.

In the thermoplastic intermediate stage, the product may also be worked up by injection-molding or extrusion or in a kneader.

In many cases, the materials in this intermediate stage may also be mixed with water, organic solvents, plasticizers, extenders or fillers and thereby modified in numerous ways and applied.

The materials according to the invention are also suitable for use as finishes for treating fibers in impregnating agents. For this purpose they may be applied either as the finished mixture of organic component and silicate component or as two separate baths. It is therefore preferable first to apply that component which adheres more firmly to the fiber, in other words the isocyanate component on organic material and the silicate component on inorganic material.

Furthermore, fibers and sheet structures which can be used e.g. for manufacturing synthetic incombustible paper or for manufacturing non-woven webs may be produced by extruding the mixtures through dies or slots.

The invention is further illustrated but is not intended to be limited by the following examples in which all parts and percentages are by weight unless otherwise specified.

EXAMPLES:

Starting materials:
a. Polyisocyanate component:
  A 1. Diisocyanatodiphenylmethane is distilled from the crude phosgenation product of an aniline-formaldehyde condensate until the distillation residue has a viscosity of 400 cP at 25° C (dinuclear content: 45.1% by weight, trinuclear content: b 22.3% by weight, proportion of higher-nuclear polyisocyanates: 32.6% by weight) NCO-content 30-31% by weight.
  A 2. Similarly prepared polyisocyanate with a viscosity of 700 cP at 25° C (dinuclear content: 40.6% by weight, trinuclear content: 27.2% by weight, proportion of higher-nuclear polyisocyanates: 32.2% by weight) NCO-content: 29-30% by weight.
  A 3. Similarly prepared polyisocyanate with a viscosity of 1700 cP at 25° C (dinuclear content: 40.3% by weight, trinuclear content: 34.0% by weight, proportion of higher-nuclear polyisocyanates: 25.7% by weight) NCO-content: 28-29% by weight.
b. Silicate component:
  B 1. Sodium silicate (water glass), 44% solids, molecular weight ratio $Na_2O:SiO_2 = 1:2$
  B 2. Sodium silicate (water glass), 34% solids, molecular weight ratio $Na_2O:SiO_2 = 1:3$
Organic component c:
  C 1. Polyethylene oxide monoalcohol with a molecular weight of 1145 started on n-butanol.
  C 2. Polyethylene oxide monoalcohol with a molecular weight of 782 started on n-butanol.
  C 3. Polyethylene oxide monoalcohol with a molecular weight of 1978 started on n-butanol.
  C 4. Aqueous solution of the sodium salt of the monoester of 1,2-tetrahydrophthalic acid and 1,1,1-trimethylol-propane, 50% solids.
  C 5. Aqueous solution of sodium salt of p-($\beta$-$\gamma$-dihydroxy-propyloxy)-benzene sulphonic acid, 30% solids.
  C 6. Aqueous solution of N-(2-aminoethyl)-2-aminoethane sulphonic acid sodium salt, 45% solids.
  C 7. Aqueous solution of aminoethane sulphonic acid, 20.2% solids.
  C 8. Aqueous solution of the sodium salt of dimethylolpropionic acid, 50% solids.
  C 9. Aqueous solution of the sodium salt of 2,2'-bis-hydroxy-methyl-ethane sulphonic acid, 50% solids.
  C 10. Aqueous solution of the sodium salt of 2-hydroxyethane sulphonic acid, 50% solids.
  C 11. Polyethylene oxide monoalcohol with a molecular weight of 1546 started on nonyl phenol.
  C 12. Aqueous solution of the reaction product of N-butyldiethanolamine and dimethyl sulphate (molar ratio 1:1), 50% solids, adjusted to pH 10 with 1 n NaOH.

C 13. Aqueous solution of disodium tartrate, 40% solids.

EXAMPLE 1

| | |
|---|---|
| 150 g of polyisocyanate A 1 <br> 20 g of trichlorofluoromethane | component I |
| 150 g of silicate component B 1 <br> 1.5 g of triethylamine <br> 0.2 g of emulsifier, sodium salt of a sulphochlorinated $C_{10}$-$C_{14}$ paraffin mixture | component II |
| 1.5 g of organic component C 6 } | component III |

A preliminary mixture was first prepared from components II and III and this was then vigorously mixed with component I with the aid of a high-speed stirrer for 15 seconds. The reaction mixture was poured into a paper packet where it began to foam up after 150 seconds and solidified 13 seconds later. A hard, inorganic-organic foam was obtained which had a not quite regular cell structure and which after drying (3 h/120° C) had a gross density of 700 kg/m³ and a compression strength of 213.6 kp/cm².

EXAMPLE 2

| | |
|---|---|
| 150 g of polyisocyanate A 1 <br> 20 g of trichlorofluoromethane | component I |
| 150 g of silicate component B 1 <br> 2.5 g of triethylamine <br> 0.2 g of emulsifier according to Example 1 | component II |
| 1.5 g of organic component C 6 } | component III |

The components were mixed as described in Example 1. The reaction mixture started to form up after 40 seconds and had hardened only 6 seconds later. A hard, inorganic-organic foam with a coarse pore structure and a gross density of 310 kg/m³ was obtained.

EXAMPLE 3

| | |
|---|---|
| 150 g of polyisocyanate A 1 <br> 20 g of trichlorofluoromethane | component I |
| 150 g of silicate component B 2 <br> 1.5 g of triethylamine <br> 0.2 g of emulsifier according to Example 1 | component II |
| 4 g of organic component C 6 } | component III |

The procedure was the same as in Example 1 except that the three components were mixed simultaneously and the mixture of all three components was stirred for 30 seconds. The reaction mixture began to foam up after 65 seconds and had solidified 13 seconds later.

A hard, inorganic-organic foam with a fine, not guite regular cell structure was obtained which had a gross density of 572 kg/m³ and a compression strength of 151.0 kp/cm² after tempering for 3 hours at 120° C.

EXAMPLE 4

| | |
|---|---|
| 150 g polyisocyanate A 1 <br> 20 g of trichlorofluoromethane | component I |
| 150 g of silicate component B 1 <br> 2.0 g of triethylamine <br> 0.2 g of emulsifier according to Example 1 | component II |
| 20 g of organic component C 6 } | component III |

Components I and II are first separately vigorously mixed and then all the three components were added together and immediately mixed vigorously together with a high-speed stirrer for 10 seconds. The reaction mixture was poured into a paper mold where it began to foam up after 110 seconds and was still plastic after 1 minute. After 8 minutes it had solidified to a rock-hard inorganic-organic foam with a fine, slightly irregular pore structure. The gross density of this foam was 736 kg/m³.

EXAMPLE 5

| | |
|---|---|
| 105 g of polyisocyanate A 1 <br> 45 g of sulphonated polyisocyanate A 1 obtained by reacting polyisocyanate A 1 with gaseous sulphur trioxide at 50° C. The sulphonated polyisocyanate A 1 has a sulphur content of 0.95% by weight and a viscosity of 1800 cP at 25° C. <br> 20 g of trichlorofluoromethane | component I |
| 150 g of silicate component B 1 <br> 2.0 g of triethylamine <br> 0.2 g of emulsifier according to Example 1 | component II |
| 15 g of organic component C 6 } | component III |

Mixing was carried out as in Example 4. The mixing time was 15 seconds. The reaction mixture began to foam up after 95 seconds and has solidified to a hard, inorganic-organic foam 25 seconds later. The gross density of the product was 585 kg/m³, the compression strength 147.2 kp/cm².

EXAMPLE 6

| | |
|---|---|
| 75 g of polyisocyanate A 1 <br> 75 g of sulphonated polyisocyanate A 1 according to Example 5 <br> 20 g of trichlorofluoromethane | component I |
| 150 g of silicate component B 1 <br> 1.5 g of triethylamine <br> 0.2 g of emulsifier according to Example 1 | component II |
| 2.2 g of organic component C 6 } | component III |

Mixing of the components was carried out as in Example 1. The reaction mixture began to form up after 23 seconds and had solidified to a rock-hard foam 10 seconds later. At that point, the foam had reached an internal temperature of 102° C. The hard-elastic inorganic-organic foam obtained had a regular cell structure and medium pore size. After 3 hours tempering at 120° C, the foam had a gross density of 108 kg/m³ and a compression strength of 7.6 kp/cm².

EXAMPLE 7

| | |
|---|---|
| 75 g of polyisocyanate A 1 | |
| 75 g of sulphonated polyisocyanate A 1 according to Example 5 | component I |
| 20 g of trichlorofluoromethane | |
| 150 g of silicate component B 1 | |
| 1.5 g of triethylamine | component II |
| 0.2 g of emulsifier according to Example 1 | |
| 4.4 g of organic component C 7 } | component III |

The inorganic-organic foam was prepared as in Example 1. Mixing time of the components was 15 seconds and time until the onset of foaming 27 seconds. 14 seconds later a rock-hard foam with a regular cell structure and fine pores was obtained. After 3 hours tempering at 120° C it had a unit weight of 203 kg/m³ and a compression strength of 22.3 kp/cm².

EXAMPLE 8

| | |
|---|---|
| 75 g of polyisocyanate A 1 | |
| 75 g of sulphonated polyisocyanate A 1 according to Example 5 | component I |
| 20 g of trichlorofluoromethane | |
| 150 g of silicate component B 1 | |
| 1.5 g of triethylamine | component II |
| 0.2 g of emulsifier according to Example 1 | |
| 6.6 g of organic component C 8 } | component III |

Mixing was carried out as in Example 1. The mixing time was 15 seconds. The foaming process began after 24 seconds and was completed 7 seconds later. A hard, inorganic-organic foam with a fine regular cell structure was obtained. After tempering (3 hours at 120° C) it had a gross density of 166 kg/m³ and a compression strength of 16.8 kp/cm².

EXAMPLES 9–20

| | |
|---|---|
| polyisocyanate A 1 | component I |
| trichlorofluoromethane | |
| silicate component B 1 | |
| amine catalyst consisting of 75% by weight of N,N-dimethylaminoethanol and 25% by weight of diazabicyclooctane | component II |
| polyether polysiloxane foam stabilizer of ex.4 of U.S. Pat. No. 3 658 864. | |
| organic component c | component III |
| optionally water | |

Each component was first thoroughly mixed separately and then component II and component III were simultaneously added to component I and the three components were mixed in a cardboard beaker with the aid of a high-speed stirrer for 15 seconds. The liquid reaction mixture was poured into a paper packet where it began to foam up after a short time and hardened to an inorganic-organic light-weight with evolution of heat.

The foams at first contain water and are finely porous, largely open-celled with a regular cell structure and in most cases tough and elastic, depending on the proportion or organic constituents. The foams are distinguished by their excellent fire characterisitics, good insulating capacity in the dry state and stability of their contours at high temperatures (above 150° C). The mechanical strength properties depend on the composition but may be regarded as good in relation to their density.

The examples are summarized in Table 1.
The abbreviations have the following meanings:

$t_R$ = stirring time, mixing time of the mixture of component I, component II and component III $t_L$ = lying time, time from onset of mixing to onset of foaming $t_A$ = setting time, time from begin of mixing to hardening.

Table 1

| | component I | | component II | | |
|---|---|---|---|---|---|
| Example No. | Polyisocyanate A 1 (g) | Trichlorofluoromethane (g) | Silicate component 1 (g) | Amine catalyst (g) | Stabilizer (g) |
| 9 | 150 | 20 | 150 | 2.0 | 1.5 |
| 10 | 150 | 20 | 150 | 2.0 | 1.5 |
| 11 | 150 | 20 | 150 | 2.0 | 1.5 |
| 12 | 150 | 20 | 150 | 2.0 | 1.5 |
| 13 | 150 | 20 | 150 | 2.0 | 1.5 |
| 14 | 150 | 20 | 150 | 2.0 | 1.5 |
| 15 | 200 | — | 50 | 1 | 1.5 |
| 16 | 200 | — | 50 | 1 | 1.5 |
| 17 | 150 | 20 | 200 | 2 | 1.5 |
| 18 | 150 | 20 | 200 | 2 | 1.5 |
| 19 | 200 | — | 10 | 1 | 1.5 |
| 20 | 200 | — | 10 | 1 | 1.5 |

| | component III | | | | | |
|---|---|---|---|---|---|---|
| Example No. | Organic component c Type | Quantity (g) | Water (g) | $t_R$ (sec) | $t_L$ (sec) | $t_A$ (sec) |
| 9 | C 1 | 15 | 15 | 15 | 60 | 110 |
| 10 | C 1 | 5 | 5 | 15 | 64 | 94 |
| 11 | C 1 | 35 | 35 | 15 | 76 | 124 |
| 12 | C 11 | 13 | 27 | 15 | 83 | 225 |
| 13 | C 3 | 20 | 20 | 15 | 75 | 140 |
| 14 | C 2 | 20 | 20 | 15 | 45 | 135 |
| 15 | C 3 | 20 | 20 | 15 | 65 | 90 |
| 16 | C 2 | 20 | 20 | 15 | 60 | 90 |
| 17 | C 3 | 20 | 20 | 15 | 66 | 120 |
| 18 | C 2 | 20 | 20 | 15 | 66 | 135 |
| 19 | C 3 | 20 | 20 | 15 | 66 | 135 |
| 20 | C 2 | 20 | 20 | 15 | 60 | 125 |

| | Density (kg/m³) after drying | | Compression strength (kp/cm²) |
|---|---|---|---|
| Example No. | fresh | 2h/120°.C | |
| 9 | — | 20 | 0.17 |
| 10 | — | 23 | 0.26 |
| 11 | — | 47 | 0.23 |
| 12 | 34 | 25 | — |
| 13 | 27 | 21 | |
| 14 | 23 | 18 | |
| 15 | 16 | 15 | |
| 16 | 12.4 | 12 | |
| 17 | 43 | 32.8 | |
| 18 | 16 | 15.4 | |
| 19 | 16 | 15.4 | |
| 20 | 19.2 | 18.4 | |

EXAMPLES 21–28

The examples are summarized in Table 2. Preparation of the foams was carried out as in Example 1. Emulsifier according to Example 1 was used. The cement is a quick-setting cement (Fondue Lafarge). Abbreviations $t_R$, $t_L$ and $t_A$ were explained in Examples 9–20.

Hard inorganic-organic foams in most cases with a regular cell structure and medium pore size were obtained. Test samples were taken from them to determine the unit weight and compression strength after drying (3 h/120° C). The inorganic-organic foams obtained generally have good mechanical properties and excellent fire characteristics. Since in addition they have very good heat-insulating properties in the dry state they are particularly suitable for use as constructural materials in the building industry.

TABLE 2

| | Component I | | | | | Component II | | | | Component III | | | | | | |
|---|---|---|---|---|---|---|---|---|---|---|---|---|---|---|---|---|
| | Polyisocyanate(g) | | | | Trichloro- | Silicate | | | Emu- | Organic comp. C | | | | | | Comp- |
| | A 1 | A 2 | A 3 | Ce-ment | fluoro-methane | comp. B 1 | Ce-ment | Triethyl-amine | lsi-fier | | Quant. | $t_R$ | $t_L$ | $t_A$ | Density | ression strength |
| Ex. | (g) | (g) | (g) | (g) | (g) | (g) | (g) | (g) | (g) | Type | (g) | (sec) | (sec) | (sec) | (Kg/m³) | (Kg/cm²) |
| 21 | — | 200 | — | — | 20 | 100 | — | 2.5 | 0.2 | C 8 | 50 | 20 | 31 | 43 | 104 | 5.8 |
| 22 | — | 200 | — | — | 20 | 100 | — | 2.5 | 0.4 | C 8 | 50 | 20 | 30 | 41 | 175 | 5.2 |
| 23 | — | — | 200 | — | 20 | 100 | — | 2.5 | 0.2 | C 8 | 50 | 20 | 30 | 38 | 166 | 12.2 |
| 24 | — | — | 200 | — | 20 | 100 | — | 2.5 | 0.4 | C 8 | 50 | 20 | 28 | 28 | 177 | 13.8 |
| 25 | — | — | 200 | 50 | 20 | 100 | 50 | 2.0 | 0.4 | C 8 | 50 | 20 | 32 | 46 | 220 | 15.4 |
| 26 | — | — | 200 | 50 | 25 | 100 | 50 | 2.0 | 0.5 | C 8 | 50 | 20 | 33 | 54 | 201 | 6.2 |
| 27 | — | — | 200 | — | 25 | 100 | 100 | 2.0 | 0.5 | C 8 | 50 | 20 | 34 | 57 | 151 | 4.2 |
| 28 | 50 | — | 150 | — | 20 | 100 | — | 2.0 | 0.2 | C 13 | 50 | 20 | 26 | 35 | 114 | 5.2 |

EXAMPLES 29-35

100 g of polyisocyanate component A 1, 200 g of silicate component B 1 and 5 g of an organic component C were vigorously mixed in a cardboard beaker at room temperature with the aid of a high-speed stirrer for 15 seconds. A pourable mass was obtained which was poured out into a can. The reaction mixture began to solidify after only a few minutes and then hardened with evolution of heat within a short time.

A rock-hard but at the same time enormously elastic material was obtained which was in no way brittle and macroscopically completely homogeneous and free from pores.

The solidification times depends on the nature and quantity of the organic component C and on the ratio of silicate component to isocyanate component.

The solidification times and the maximum mixing temperatures occurring are summarized in the following table for various organic components C. In the table, $t_R$ = stirring time $t_A$ = time until onset of solidification, $t_S$ = time after the mass can no longer be spread with a trowel, $t_E$ = time until complete hardening, $t_{max}$ = maximum temperature reached during the setting process

| Example | Component C | $t_R$ (sec) | $t_A$ (min) | $t_S$ (min) | $t_E$ (min) | $t_{max}$ (° C) |
|---|---|---|---|---|---|---|
| 29 | C 12 | 15 | 5 | 8 | 18 | 107 |
| 30 | C 8 | 15 | 10 | 65 | 180 | 37 |
| 31 | C 13 | 15 | 7 | 17 | 90 | 42 |
| 32 | C 4 | 15 | 5 | 28 | 110 | 41 |
| 33 | C 5 | 15 | 20 | 120 | 300 | 32 |
| 34 | C 9 | 15 | 15 | 40 | 120 | 36 |
| 35 | C 10 | 15 | 18 | 45 | 120 | 34 |

Although the invention has been described in detail in the foregoing for the purposes of illustration, it is to be understood that such detail is solely for that purpose and that variations can be made therein by those skilled in the art without departing from the spirit and scope of the invention except as it may be limited by the claims.

What is claimed is:

1. A process for producing an inorganic-organic plastic with high strength, elasticity, dimensional stability under heat, and flame resistance, which is a composite material of a polymer/polysilicic acid gel, said composite being in the form of a solid/solid xerosol, said process comprising mixing and reacting:
   A. an organic polyisocyanate,
   B. a silica composition selected from the group consisting of:
      i. an aqueous alkali metal silicate containing about 20 - 70% by weight of said alkali metal silicate;
      ii. an aqueous silica sol having a solids content from 20 to 50%, and
      iii. mixtures thereof,
   C. an organic compound which contains
      i. at least one hydrogen atom capable of reacting with an isocyanate group, and
      ii. at least one group selected from the group consisting of:
         a. an ionic group,
         b. a group capable of forming an ionic group in the presence of an alkali metal silicate, and
         c. non-ionic hydrophilic groups, said non-ionic hydrophilic groups being polyether groups which are built up from ethylene oxide to an extent of at least 10% by weight, with the proviso that if said organic compound contains non-ionic hydrophilic groups, said organic compound contains only one hydrogen atom capable of reacting with an isocyanate group,
   said mixing being carried out in such a way that either components (B) and (C) are mixed prior to mixing with (A), or components (A), (B) and (C) are mixed simultaneously.

2. The process of claim 1, wherein the organic polyisocyanate is the phosgenation product of an aniline-formaldehyde condensation.

3. The process of claim 1, wherein the proportion by weight of component (A) to component (B) is between 70:30 and 20:80.

4. The process of claim 1, wherein the quantity of groups (C)(ii)(a) or (b) is 2-200 milliequivalents per 100 grams of components (A), or the non-ionic hydrophilic groups of component (C) comprises 1-50% by weight based on component (A).

5. The process of claim 1, wherein compounds in addition to isocyanates which effect hardening of the water soluble silicates are included in the mixture.

6. The process of claim 1 wherein 0-40% by weight of an inert liquid boiling in the range of −25° to +80° C is included in the reaction mixture as a blowing agent and the reaction proceeds with concomitant foaming.

7. The process of claim 1, wherein 0.001 - 10% by weight of activator is included in the reaction mixture.

8. The process of claim 1, wherein 0-20% by weight of foam stabilizer is included in the reaction mixture.

9. The process of claim 1, wherein 0-20% by weight of emulsifying agent is included in the reaction mixture.

10. The process of claim 1, wherein an inorganic or organic particulate or pulverulent material is included in the reaction mixture.

11. The process of claim 1, wherein the organic compound (C) is a compound of the formula:

$$X - R - Y$$

wherein
$X =$ —OH, —SH, —COOH, —NHR$^1$
$R = C_1$-$C_{20}$-alkylene,

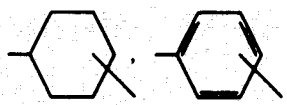

$R^1 =$ —H, $C_1$-$C_{12}$-alkyl,

$Y =$ —SO$_3$H, —COOH, —SO$_3^{(-)}$, —OSO$_3^{(-)}$, —COO$^{(-)}$, NR$_3^{1(+)}$, —O—(—CH$_2$—CH$_2$—O—)—$_n$R$^1$, or,

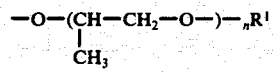

with at least 10% —O(—CH$_2$—CH$_2$—O—)—$_n$R$^1$ blocks,
$n = 2$-$100$.

12. The process of claim 1, wherein said silica compound is an aqueous alkali metal silicate.

13. The product produced by the process of claim 12.

14. The product of the process produced by claim 1.

* * * * *